United States Patent
Hottovy et al.

(10) Patent No.: US 6,262,191 B1
(45) Date of Patent: Jul. 17, 2001

(54) DILUENT SLIP STREAM TO GIVE CATALYST WETTING AGENT

(75) Inventors: John D. Hottovy, Bartlesville, OK (US); David H. Burns, Houston, TX (US); Scott E. Kufeld, Houston, TX (US); Timothy Roetman, Houston, TX (US); Ragavan Vaidyanathan, Houston, TX (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/265,286

(22) Filed: Mar. 9, 1999

(51) Int. Cl.⁷ .................................. C08F 2/06; C08F 6/10
(52) U.S. Cl. .................. 526/64; 526/68; 526/70; 422/132; 528/501
(58) Field of Search ................ 422/132; 526/64, 526/68, 70; 528/501

(56) References Cited

U.S. PATENT DOCUMENTS

| | | | |
|---|---|---|---|
| 4,182,810 * | 1/1980 | Willcox | 526/64 |
| 4,424,341 | 1/1984 | Hanson et al. | 528/501 |
| 4,501,885 | 2/1985 | Sherk et al. | 528/501 |
| 4,613,484 | 9/1986 | Ayers et al. | 422/132 |
| 4,737,280 | 4/1988 | Hanson | 210/181 |
| 4,832,915 | 5/1989 | Messura | 422/62 |
| 5,533,437 | 7/1996 | Howard et al. | 95/42 |
| 5,575,979 | 11/1996 | Hanson | 422/132 |
| 5,597,892 * | 1/1997 | Hanson | 528/501 |

* cited by examiner

Primary Examiner—David W. Wu
Assistant Examiner—R. Rabago
(74) Attorney, Agent, or Firm—Polly C. Owen

(57) ABSTRACT

A process and apparatus for passing a polymerization effluent, comprising solid polymer, unreacted monomer, diluent and minor amounts of contaminants, to a high pressure flash where most of the fluid components are flashed and wherein a slip stream comprising diluent and minor amounts of monomer is separated from the bulk of the flashed fluid components. The slip stream is subjected to olefin removal to give an essentially olefin-free stream for recycle to a catalyst mud preparation area. The bulk of the flashed fluid components are recycled directly back to the polymerization zone without expensive olefin removal, although treatment to remove other contaminants can optionally be performed. The polymer and entrained fluid is passed to a low pressure flash zone where the fluids are flashed off, compressed and joined with the flash from the high pressure flash tank. Because the bulk of the fluids are removed in the high pressure flash, compression and cooling of product fluids prior to recycle is kept to a minimum.

20 Claims, 1 Drawing Sheet

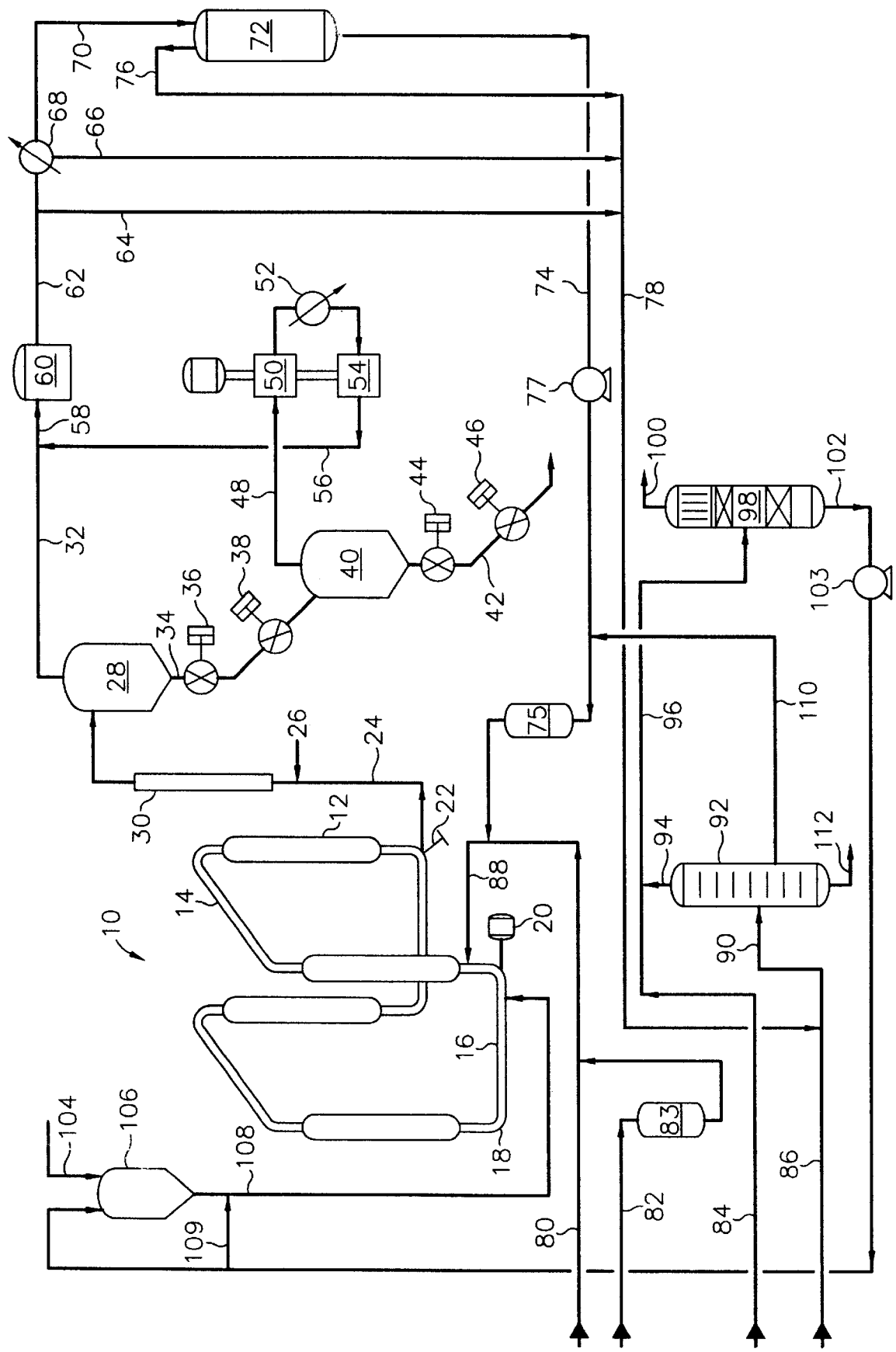

DILUENT SLIP STREAM TO GIVE CATALYST WETTING AGENT

BACKGROUND OF THE INVENTION

This invention relates to the polymerization of monomers in a liquid diluent.

Addition polymerizations are frequently carried out in a liquid which is a solvent for the resulting polymer. When high density (linear) ethylene polymers first became commercially available in the 1950's this was the method used. It was soon discovered that a more efficient way to produce such polymers was to carry out the polymerization under slurry conditions. More specifically, the polymerization technique of choice became continuous slurry polymerization in a pipe loop reactor. Subsequent to the polymerization, the polymer must be separated from the diluent and the diluent recovered for recycle.

Preferably the solid catalyst for such reactions is first combined with diluent and the resulting catalyst mud introduced into the reactor.

Both environmental sensitivity and economics dictate that as little waste as possible occurs in such processes. Accordingly, modern slurry plants "lose" so little diluent during the separation and diluent recovery process that only a minute amount of "make-up" diluent is required. Indeed, so little make-up diluent is needed that the make-up diluent is of insufficient quantity to produce the catalyst mud. Hence recycle diluent must be used. However, recycle diluent unavoidably contains some unreacted monomer dissolved in it. While some monomer can be tolerated, it is greatly preferred to have monomer-free diluent for this step. Further complicating the polymer separation and diluent recovery is the presence of small amounts of other undesirable compounds in the recycle diluent such as alkanes other than the diluent, olefins other than the monomer or monomers, very low molecular weight oligomers produced in the reactor such as dimers and trimers, iert materials such as nitrogen and, finally, oxygen which is a catalyst poison and must be removed or at least essentially removed.

SUMMARY OF THE INVENTION

It is an object of this invention to provide a process and apparatus for polymer recovery and recycle of diluent wherein monomer-free diluent is available for preparation of catalyst mud;

It is a further object of this invention to simplify the apparatus and process steps necessary for polymer recovery and diluent recycle in a slurry olefin polymerization process; and It is yet a further object of this invention to avoid unnecessary separation of monomer from the diluent which is recycled directly back to the reactor.

It is still yet a further object of this invention to reduce the amount of vapor compression required.

In accordance with this invention, effluent from a polymerization zone is separated into a polymer stream and a diluent stream; thereafter a slip stream is taken off the diluent stream, subjected to monomer removal, and passed to a catalyst mixing zone, the remaining portion of the diluent stream being recycled to the polymerization zone.

BRIEF DESCRIPTION OF THE DRAWINGS

In the drawing, forming a part hereof,

The FIGURE is a schematic representation of a slurry polymerization process wherein a slip stream is taken off a diluent recycle stream to provide a monomer-free diluent to wet catalyst.

DETAILED DESCRIPTION OF THE INVENTION

Surprisingly, it has been found that by taking a slip stream of diluent contaminated with monomer and comonomer from the overhead of a high pressure flash, and combining it with fresh comonomer feed to a comonomer purification column, and thereafter passing the thus partially purified diluent slip stream to a lighter olefin removal column, the number of purification columns can be cut by two and less overall energy is required to operate the process. It is quite unexpected that taking a stream contaminated with small amounts of comonomer and combining it with the comparatively large volume of fresh comonomer results in a benefit rather than a detriment.

The present invention is applicable to any polymerization of at least one monomer m a liquid that is at least substantially non-reactive.

The invention is particularly applicable to olefin polymerizations in a diluent in which the resulting polymer is insoluble under polymerization conditions. Most particularly the invention is applicable to any olefin polymerization in a loop reactor utilizing a diluent so as to produce a product slurry of polymer and diluent. Suitable olefin monomers are 1-olefins having up to 8 carbon atoms per molecule and no branching nearer the double bond than the 4-position. The invention is particularly suitable for the copolymerization of ethylene and a higher 1-olefin such as butene, 1-pentene, 1-hexene, 1-octene and 1-decene. Especially preferred is ethylene and 0.01 to 10, preferably 0.01 to 5, most preferably 0.1 to 4 weight per cent higher olefin based on the total weight of ethylene and comonomer. Alternatively sufficient comonomer can be used to give the above-described amounts of comonomer incorporation in the polymer.

Suitable diluents (as opposed to solvents or monomers) are well known in the art and include hydrocarbons which are inert and liquid under reaction conditions. Suitable hydrocarbons include isobutane, n-butane, propane, n-pentane, i-pentane, neopentane, and n-hexane, with isobutane being especially preferred.

Suitable catalysts for slurry olefin polymerizations are well known in the art. Particularly suitable is chromium oxide on a support such as silica as broadly disclosed, for instance, in Hogan and Banks, U.S. Pat. No. 2,285,721 (March 1958), the disclosure of which is hereby incorporated by reference. Reference herein to silica supports is meant to also encompass any known silica containing support such as, for instance, silica-alumina, silica-titania and silica-alumina-titania. Any other known support such as aluminum phosphate can also be used. The invention is also applicable to polymerizations using organometal catalysts including those frequently referred to in the art as 'Ziegler' catalysts.

In such polymerizations using a loop reaction zone, the take off of polymer (admixed with diluent) can be done on an intermittent basis using settling legs as is well known in the art. Preferably, however, the reactor effluent is taken off continuously which can be made feasible, for instance, by operating the reactor at as high a solids concentration as possible. For typical 0.936–0.970 density polymers (more generally 0.950–0.960) this can be at least 40 weight per cent solids based on the weight of the polymer particles and the weight of the diluent in the reaction zone. With other resins, it can be as high as 70 weight per cent or higher. With lower density resins (0.920–0.935) the solids content will generally be in the range of 20–30 weight per cent based on the weight of the polymer particles and the weight of the diluent in the reaction zone. While continuous take off has advantages over intermittent take off from settling legs, it has the disadvantage of resulting in more diluent being taken off with the polymer. In accordance with a preferred embodiment of this invention, using a high pressure flash (for instance, as a result of heating the reactor effluent) in combination with a low pressure flash and recycle of the bulk of the diluent with only minimal purification at most (i.e. to remove oxygen, and/or water for instance) and drawing a recycle diluent slip stream which is further treated to remove monomers to provide monomer-free diluent for catalyst preparation, a particularly efficient process is provided. This benefit extends to both lower plant construction costs, by virtue of using only two fractionation columns instead of four, and lower operating costs.

Referring now to the FIGURE as an illustration of one embodiment of the invention, there is shown a loop reactor 10 having vertical segments 12, upper horizontal segments 14 and lower horizontal segments 16. These upper and lower horizontal segments define upper and lower zones of horizontal flow. Alternatively, the upper and/or lower segments can be a continuously curved structure, i.e. two elbows joined together. The reactor can be cooled by conventional means such as two-pipe heat exchangers. Each segment is connected to the next segment by a smooth bend or elbow 18 thus providing a continuous flow path substantially free from internal obstructions. The polymerization mixture is circulated by means of an impeller (not shown) driven by motor 20. An elongated hollow appendage for continuously taking off an intermediate product slurry is designated broadly by reference character 22. Continuous take off mechanism 22 is shown located adjacent a downstream end of one of the lower horizontal reactor loop sections 16 and adjacent a connecting elbow 18.

The continuous take off appendage is shown at the downstream end of a lower horizontal segment of the loop reactor which is one preferred location. Another preferred location is on the bottom part of the elbow of a descending (based on the direction of flow) vertical segment. The location can be in an area near the last point in the loop where flow turns upward before the catalyst introduction point so as to allow fresh catalyst the maximum possible time in the reactor before it first passes a take off point. However, the continuous take off appendage can be located on any segment or any elbow.

The continuously withdrawn intermediate product slurry (reactor effluent) is passed via polymerization effluent withdrawal conduit 24 to high pressure flash chamber 28. Water or other suitable agents are generally injected via water injection conduit 26 to kill the catalyst. Since these are catalyst poisons by definition, they must be removed or at least essentially removed from any recycle to the reactor. Conduit 24 includes a surrounding conduit 30 which is provided with a heated fluid which provides indirect heating to the slurry material in polymerization effluent withdrawal conduit 24 thus providing a flash line heater to heat the reactor effluent prior to introduction into the high pressure flash chamber 28 which is the main vapor separation flash zone.

Vapor, which in the embodiment shown comprises most of the non-solid components of the polymerization effluent, is withdrawn via high pressure flash gas line 32. This vapor is primarily isobutane diluent. It also contains most of the unreacted ethylene and 1-hexene monomers. Solids (polymer) and a small amount of entrained solvent and monomers are withdrawn via high pressure flash chamber solids recovery line 34 which contains upper valve 36 and lower valve 38. Valve 36 is opened periodically to allow polymer flow downward through line 34. Then valve 36 is closed and valve 38 is opened which allows polymer flow out toward recovery and unavoidably allows some back flow of vapor into the area of line 34 between the two valves. If any polymer fines go overhead with the vapor they can be removed by conventional filters and/or cyclones.

The contents of solids recovery line 34 then empties into a second flash zone, low pressure flash chamber 40 where the solids are separated from the entrained liquid and/or vapor. The solids pass via line 42 having an upper valve 44 and a second lower valve 46 which operate in the same manner as valves 36 and 38. The resulting polymer then can be processed in a conventional finishing operation such as a screw extruder.

Overhead, which contains most of the entrained liquid and/or vapor, from the low pressure flash chamber 40 passes via low pressure flash gas line 48 to a pressurizing means such as, for instance, first stage flash gas compressor 50, flash gas cooler 52 and second stage flash gas compressor 54. The resulting compressed and cooled gas (mostly diluent, monomers, nitrogen, butane and hexane) with a trace of other materials (oligomers, hydrogen, methane, ethane, propane and water) is combined with line 32 via line 56 carrying the high pressure flash gas to give combined flash gasses line 58. The combined flash gases stream is then passed through deoxygenation bed 60.

Since oxygen is generally a catalyst poison it is greatly preferred to subject this entire stream carried by line 58 to an oxygen removal step. Fresh ethylene feed streams are generally sufficiently oxygen free so as not to poison the catalyst as they arrive from the supplier. If the fresh ethylene is not free of oxygen, removal steps are generally employed before the monomer is used. In any event, fresh main monomer such as ethylene is generally passed through a main monomer treater, as shown here by reference character 83 to remove water and any other catalyst poisons that may be present in the fresh ethylene such as CO, $CO_2$, sulfur compounds or oxygenated compounds as is known in the art.

The effluent from deoxygenation bed 60 passes via deoxygenated flash gas (total diluent recycle) line 62 to diluent recycle cooler 68. At this point a slip line is withdrawn for special monomer removal. This can either be done by taking a vapor stream via diluent recycle vapor slip stream line 64 or by diluent recycle liquid slip stream line 66, or both, these lines being controlled, if desired, by valves, not shown.

The bulk of the monomer-containing recycle diluent is passed via diluent recycle surge vessel feed line 70 to diluent recycle surge (storage) vessel 72. Vessel 72 serves as a flash tank in that it is a vapor-liquid separation drum. Lights (mostly ethylene monomer and diluent) flash off via lights removal line 76 and become a part of combined diluent slip stream recycle line 78. The bulk of the recycle stream comprising diluent, 1-hexene monomer, and ethylene monomer is passed directly back to the reactor without undergoing any monomer removal step via main diluent recycle line 74 containing pump 77. If desired, other purification steps such as water removal can be carried out on this stream by means, for instance of comonomer and recycle diluent treater 75.

Thus the total diluent recycle as found in stream 62 is divided into combined diluent slipstream recycle line 78 and main diluent recycle line 74.

In a more specific embodiment of this invention, if excessive amounts of lights (i.e. nitrogen, ethane, propane, for instance) build up in the main diluent recycle line 74, a greater amount of diluent vapor slip slipstream can be withdrawn via line 64 and/or 76, preferably 76.

In a similar manner, in increased amount of liquid recycle can be pulled via diluent recycle liquid slip stream line 66 to control heavies (n-hexane or oligomers, for instance) in the main diluent recycle line.

Fresh 1-hexene comonomer is brought in via hexene comonomer feed line 86 and passed to a hexene degassing and heavies removal column 92.

Overhead from hexene degassing and heavies removal column 92 is removed via hexene degassing overhead line 94 and introduced into degassing and lights removal column 98. Fresh diluent, isobutane in the case being illustrated, is introduced via fresh diluent make up line 84. Because of the exceptional efficiency of the overall process only a very small amount of make up diluent is required, for instance less than 1 weight per cent per hour, generally only about 0.001–0.5, preferably 0.005–0.01 pounds per pound of produced polymer in the reactor. For convenience, fresh diluent make up line 84 and hexene degassing overhead line 94 can be combined to form isobutane degassing and lights removal column inlet line 96 since the stream carried by line 94 contains mostly isobutane with some ethylene, which ethylene can be easily separated in column 98 and removed overhead via vapor removal line 100. In addition to removing ethylene from the fresh and recycle isobutane, column 98 also removes oxygen and nitrogen from the fresh and recycle isobutane. These can go to flare or the oxygen and nitrogen can be separated from the ethylene and the ethylene recycled to the reaction zone by conventional means not shown.

The combined slip stream flow via line 78 is passed to the hexene degassing and heavies removal column 92 which is a standard component for purifying fresh 1-hexene monomer. Column 92 produces purified 1-hexene (returned to the reaction zone via line 110) by removing lights (isobutane and ethylene) via line 94 and by removing hexane via line 112.

In accordance with this invention the slip stream diluent stream containing undesirable monomers is purified by introducing it into column 92 with all of the fresh 1-hexene monomer. This is done, for example simply by joining combined slip stream line 78 and fresh 1-hexene monomer introduction line 86 to give hexene degassing and heavies removal column inlet line 90 which feeds column 92. Of course separate introduction of lines 78 and 86 can be used if it is desired to fine tune the introduction point for the two different feed streams.

Other minor diluent-containing streams such as fluff drying purge (typically containing, in addition to diluent, minor amounts of lights such as nitrogen and ethylene as well as 1-hexene comonomer) can also be fed to degassing column 92 if desired.

Recycle diluent is then withdrawn from degassing and lights removal column 98 via olefin-free diluent recycle line 102. Pump 103 serves to propel liquid slip stream recycle diluent to the catalyst mixing area and to boost the pressure to reactor pressure. Also in line 102 can be coolers, not shown. This stream has had 1-hexene comonomer removed in column 92 and ethylene monomer removed (via line 100) in column 98. This thus purified slip stream recycle diluent is introduced into catalyst mud pot 106 where it is mixed with dry catalyst introduced via catalyst introduction line 104. The resulting catalyst/purified mud is then flushed into the reaction zone via catalyst mud introduction line 108 using flush isobutane from line 109.

Further as to the fresh feed lines, there is provided an optional ingredient feed line 80 for any other ingredient that might be desired such as hydrogen for molecular weight control.

The main monomer feed, ethylene in the case being illustrated, is introduced via main monomer fresh feed line 82. Lines 74, 80 and 82 can be introduced separately into the reaction zone or joined to form combined fresh ethylene and main diluent recycle line 88 as shown.

The high pressure flash chamber zone can be operated at a pressure within the range of 100–1500 psia (7–105 kg/cm$^2$), preferably 125–275 psia (8.8–19 kg/cm$^2$), more preferably 150–250 psia (10.5–17.6 kg/cm$^2$). The high pressure flash chamber zone can be operated at a temperature within the range of 100–250° F. (37.8–121° C.), preferably 130–230° F. (54.4–110° C.), more preferably 150–210° F. (65.6–98.9° C.). The narrower ranges are particularly suitable for polymerizations using 1-hexene comonomer and isobutane diluent, with the broader ranges being suitable for higher 1-olefin comonomers and hydrocarbon diluents in general.

The low pressure flash chamber zone can be operated at a pressure within the range of 1–50 psia (0.07–3.5 kg/cm$^2$), preferably 5–40 psia (0.35–2.8 kg/cm$^2$), more preferably 10–40 psia (0.7–2.8 kg/cm$^2$). The low pressure flash tank zone can be operated at a temperature within the range of 100–250° F. (37.8–121° C.), preferably 130–230° F. (54.4–110° C.), more preferably 150–210° F. (65.6–98.9° C.). Generally the temperature in the low pressure flash chamber zone will be the same or 1–20° F. (0.6–11° C.) below that of the high pressure flash chamber zone although operating at a higher temperature is possible. The narrower ranges are particularly suitable for polymerizations using 1-hexene comonomer and isobutane diluent, with the broader ranges being suitable for higher 1-olefin comonomers and hydrocarbon diluents in general.

At least 80 weight per cent of the fluid components (liquids and vapors) can easily be flashed overhead (i.e. via line 32) using the high pressure flash chamber. Preferably temperature and pressures are chosen so as to flash at least 90 weight per cent overhead, most preferably at least 95 weight per cent. Generally pressures in the range of 150–200 psia (10.5–14 kg/cm$^2$) will be used which—with isobutane diluent, ethylene monomer and enough 1-hexene comonomer to give 0.945–0.956 density polymer (as measured by ASTM D 1505-68)—would result in between 90 and 95 weight per cent being flashed overhead from the high pressure flash zone when a flash line heater or other means is employed to give an appropriate temperature as set out hereinbefore.

While the invention is described in the FIGURE in connection with a system using a flashline heater and a high pressure flash tank/low pressure flash combination, it is also applicable to a system with only a low pressure flash with or without a flashline heater, i.e. line 26 could feed directly to low pressure flash tank 40 which would be the same as restricting the flash off the high pressure flash tank to zero.

There are two considerations regarding the use of recycle for catalyst mud preparation and introduction into the reaction zone.

The first consideration is the actual contact of dry catalyst with diluent to wet the catalyst and produce a catalyst mud. For this wetting, only about 0.01–5, preferably 0.02–2, more preferably 0.03–1 weight per cent of the total recycle diluent is required. At this stage there must be no monomer or at least essentially no monomer in the contacting recycle diluent.

The second consideration is the flushing of the mud into the reaction zone. Here a small amount of comonomer and even a very small amount of ethylene can be tolerated although monomer free or at least essentially monomer free diluent is preferred.

Since only about 0.5–20, more generally 1–10, most generally 2–5 weight per cent of the recycle diluent is required for wetting and flushing the catalyst, the remaining 80–99.5, more generally 90–99, most generally 95–98 weight per cent can just be recycled without olefin removal in accordance with this invention. The amount main diluent recycle will be toward the low end of these ranges, i.e. more like 80–90 or at least 85–95 weight per cent of the total diluent prior to withdrawing any slip stream recycle diluent in those instances where it is desired to control heavies or lights build up as described hereinbefore. While defined in terms of percentages based on total recycle diluent, these same percentage numbers can be used to define recycle streams based on diluent removed overhead from the high pressure flash chamber (instead of total recycle diluent) since very little isobutane is entrained in the polymer going to the low pressure flash chamber.

By essentially olefin free as used in connection with recycle diluent as in line 102 is meant 0–1 ppm, or alternatively 1–10 or as much as 5–200 ppm by weight based on the weight of monomer and diluent in the case of ethylene.

Equally low levels of higher olefin content in the recycle diluent line as in line 102 can be achieved in accordance with this invention although 0–2 weight per cent or alternatively 1–10 weight per cent based on the weight of monomer and diluent in the case of higher olefins such as 1-hexene can be tolerated.

CALCULATED ILLUSTRATIVE EMBODIMENT

The following is a simulation of a polymerization and polymer finishing process carried out in accordance with one embodiment of this invention. All materials are described in terms of kg/hr.

Oxygen-free fresh ethylene monomer is passed through a treating unit to remove any water or other catalyst poisons at a rate of about 12,000 kg/hr as depicted in the FIGURE. No hydrogen is introduced. Fresh 1-hexene comonomer is introduced at a rate of about 60 kg/hr. Make up isobutane diluent is introduced at a rate of about 18 kg/hr. Chromium oxide on a silica support is introduced into a mud pot.

Polymerization effluent is withdrawn from the reaction zone via a continuous take off, passed through a flash line heater to vaporize at least most of the liquid diluent and introduced into a high pressure flash. The high pressure flash tank is operated at a pressure of about 165 psia (11.6 kg/cm$^2$) and a temperature of about 180° F. (82.2° C.). Most (94 weight per cent) of the liquid is flashed overhead and divided into a main stream and a slip stream. The main stream (mostly isobutane diluent with a small amount of ethylene and 1-hexene) is recycled to the reaction. The slip stream is subjected to 1-hexene removal and subsequently ethylene removal as shown in FIGURE 1 (by means of hexene degassing and isobutane degassing columns, respectively). Ethylene in an amount of about 144 kg/hr and small amounts of nitrogen, ethane, isobutane, and traces of oxygen propane, butane and water are taken off the top of the isobutane degassing column. A very small amount of 1-hexene, n-hexane, oligomer and possibly a very small amount of isobutane are discharged from the bottom of the hexene degassing column. The polymer and a small amount of entrained liquid is passed from the lower portion of the high pressure flash tank to a low pressure flash tank where most of the remaining liquid is flashed overhead and the polymer is recovered, all as shown in the FIGURE. The resulting polymer has a density of about 0.95 g/cc and a melt flow as measured by ASTM D 1238, Condition E of about 0.2.

While this invention has been described in detail for the purpose of illustration, it is not intended to be limited thereby but is intended to cover all changes and modifications within the spirit and scope thereof.

That which is claimed is:

1. A process comprising:
    introducing an effluent from a polymerization zone, said effluent comprising solid polymer and a fluid comprising diluent, into a flash zone under conditions of temperature and pressure such that a major portion of said fluid flashes overhead to form a flash gas stream;
    separately withdrawing said solid polymer and remaining fluid as an intermediate product of said process;
    dividing said flash gas stream into two streams, a main diluent recycle stream which constitutes a major portion of said flash gas stream, and a diluent recycle slip stream which constitutes a minor portion of said flash gas stream;
    recycling said main diluent recycle stream to said polymerization zone;
    passing said diluent recycle slip stream through an olefin removal zone to produce a purified recycle diluent slip stream; and
    passing said purified recycle diluent slip stream to a catalyst mixing zone.

2. A process according to claim 1 wherein said solid polymer is a copolymer produced from ethylene and a higher 1-olefin, wherein said flash zone is a high pressure flash zone and wherein said solid polymer is recovered by passing said intermediate product of said process to a second flash zone operated at a lower pressure than the pressure of said high pressure flash zone and flashing at least a major portion of said remaining fluid from said intermediate product and wherein said olefin removal zone comprises a first olefin removal zone where unreacted higher 1-olefin is removed and a second olefin removal zone where unreacted ethylene is removed.

3. A process according to claim 2 wherein said effluent is heated prior to said introducing into said high pressure flash zone.

4. A process according to claim 2 wherein said high pressure flash zone is operated at a temperature within the range of 130–230° F. and a pressure within the range of 127–275 psia.

5. A process according to claim 2 wherein said second flash zone is operated at a temperature within the range 130–230° F. and a pressure within the range of 5–40 psia.

6. A process according to claim 2 wherein said fluid introduced into said high pressure flash zone comprises predominantly diluent with lesser amounts of unreacted ethylene monomer and unreacted higher 1-olefin.

7. A process according to claim 2 wherein said higher 1-olefin is 1-hexene and said diluent is isobutane.

8. A process according to claim 7 wherein, in said second olefin removal zone, lights comprising hydrogen, nitrogen, methane and ethane are also removed.

9. A process according to claim 2 wherein said purified recycle diluent slip stream is mixed with chromium oxide on a silica support in said catalyst mixing zone.

10. A process according to claim 2 wherein said main diluent recycle stream is passed through a treater zone to remove catalyst poisons to thus give an essentially catalyst poison-free, olefin-containing main diluent recycle stream.

11. A process according to claim 10 wherein said essentially catalyst poison-free, olefin-containing diluent recycle stream is passed to said polymerization zone without any olefin removal step.

12. A process according to claim 2 wherein said purified recycle diluent slip stream is divided into a first part and a second part, said first part being used to contact solid catalyst in said catalyst mixing zone to produce a catalyst mud and said second part being used to flush said catalyst mud into said polymerization zone.

13. A process according to claim 12 wherein said first part constitutes between 0.02–2 weight per cent based on the total diluent in said flash gas stream.

14. A process comprising:

continuously withdrawing an effluent from a closed loop polymerization zone, said effluent comprising solid ethylene/1-hexene copolymer and a fluid comprising isobutane with a minor amount of ethylene monomer and 1-hexene comonomer therein;

passing said effluent through a heating zone and thereafter into a high pressure flash zone operated at a temperature of 150–210° F. and a pressure of 150–250 psia, whereby 90–95 weight per cent of said fluid flashes overhead to form a predominantly isobutane high pressure flash gas stream;

separately withdrawing said copolymer and entrained liquid as an intermediate product of said process and passing said intermediate product of said process to a low pressure flash zone operated at a temperature within the range of 150–210° F. and a pressure within the range of 10–40 psia;

vaporizing and flashing said entrained liquid from said low pressure flash zone to produce a predominantly isobutane low pressure flash zone flash stream;

compressing and cooling said low pressure flash zone flash stream to produce a compressed low pressure flash zone flash stream and combining said compressed low pressure flash zone flash stream with said high pressure flash gas stream to give a total recycle isobutane stream;

dividing said total recycle isobutane stream into two streams, a main isobutane recycle stream which comprises 88–92 per cent of said isobutane in said total recycle isobutane stream, and an isobutane recycle slip stream which comprises the remainder of said isobutane in said total recycle isobutane stream;

passing said main isobutane recycle stream through a treating zone to remove water and then to said polymerization zone;

passing said isobutane recycle slip stream along with fresh 1-hexene feed through a first fractionation zone to separate out essentially all of said 1-hexene contained in said isobutane recycle slip stream and recovering a purified isobutane recycle slip stream having 1–10 ppm 1-hexene;

passing said purified isobutane recycle slip stream to a second fractionation zone where lights including ethylene are removed to give further purified isobutane recycle slip stream having 0–1 ppm ethylene;

cooling said further purified isobutane recycle slip stream to give a cooled further purified isobutane recycle slip stream;

passing said cooled further purified recycle slip stream to a catalyst mixing zone where it is used to produce a catalyst mud comprising chromium oxide on silica; and passing said catalyst mud to said polymerization zone.

15. A process comprising:

copolymerizing ethylene and a higher 1-olefin in a polymerization zone in the presence of a liquid diluent to produce a copolymer;

withdrawing an effluent from said polymerization zone, said effluent comprising withdrawn solid copolymer, withdrawn diluent, withdrawn unreacted ethylene and withdrawn unreacted higher 1-olefin;

passing said effluent into a flash zone under conditions of temperature and pressure such that a major portion of fluid components therein flash overhead to form a flash gas stream;

recovering said withdrawn solid copolymer and remaining fluid components from said flash zone as a product of said process;

dividing said flash gas stream into two streams, a main withdrawn diluent recycle stream which constitutes a major portion of said flash gas stream, and a withdrawn diluent recycle slip stream which constitutes a minor portion of said flash gas stream;

recycling said main withdrawn diluent recycle stream to said polymerization zone;

passing said withdrawn diluent recycle slip stream and a fresh higher 1-olefin feed to a higher 1-olefin degassing zone;

withdrawing from said higher 1-olefin degassing zone a degassed higher 1-olefin comonomer feed stream and an overhead stream comprising diluent and ethylene;

passing said overhead stream comprising diluent and ethylene to a lights removal zone;

removing ethylene as an overhead stream from said lights removal zone and recovering a purified diluent recycle slip stream as a product of said lights removal zone; and passing said purified diluent recycle slip stream to a catalyst mixing zone.

16. A process according to claim 15 wherein said 1-olefin is 1-hexene and said diluent is isobutane and wherein said effluent is continuously withdrawn.

17. A process according to claim 2 wherein said purified recycle diluent slip stream has 0–1 ppm ethylene and 0–1 ppm higher 1-olefin.

18. A process according to claim 7 wherein said purified recycle diluent slip stream has 0–1 ppm ethylene and 0–1 ppm hexene.

19. A process according to claim 2 wherein said purified recycle diluent slip stream has 1–10 ppm ethylene and 1–10 ppm higher 1-olefin.

20. A process according to claim 7 where said purified recycle diluent slip stream has 0–1 ppm ethylene and 1–10 ppm hexene.

* * * * *